US00RE41438E

(19) United States
(12) Reissued Patent
Hall et al.

(10) Patent Number: US RE41,438 E
(45) Date of Reissued Patent: Jul. 13, 2010

(54) FIBER AMPLIFIER WITH ONE SINGLE MODE CORE HAVING MODIFIED GAIN SPECTRUM

(75) Inventors: Douglas W. Hall, Corning, NY (US); Mark A. Newhouse, Corning, NY (US)

(73) Assignee: Oclaro Technology, plc, Paignton (GB)

(21) Appl. No.: 09/105,572

(22) Filed: Jun. 26, 1998

Related U.S. Patent Documents

Reissue of:
(64) Patent No.: 5,131,069
Issued: Jul. 14, 1992
Appl. No.: 07/743,726
Filed: Aug. 12, 1991

(51) Int. Cl.
*G02B 6/00* (2006.01)
*G02B 6/22* (2006.01)

(52) U.S. Cl. ..... 385/142; 385/123; 385/30; 385/141; 372/6; 372/9; 372/19; 372/68

(58) Field of Classification Search ..... 385/123, 385/142, 30, 141, 27, 126; 372/6, 9; 359/341
See application file for complete search history.

(56) References Cited

U.S. PATENT DOCUMENTS 4,778,237 A * 10/1988 Sorin et al.
5,050,949 A 9/1991 DiGiovanni et al. ..... 372/6 X
5,245,467 A * 9/1993 Grasso et al. ..... 359/342
5,257,273 A * 10/1993 Farries et al.

OTHER PUBLICATIONS

"Optics Guide 4", Melles Griot pp. 11–2–11–3.
"Introduction to Materials Science for Engineers" Shackelford, MacMillan Publishing, ©1985, pp. 340–342.

* cited by examiner

*Primary Examiner*—Frank G Font
*Assistant Examiner*—Eric Wong
(74) *Attorney, Agent, or Firm*—Patterson & Sheridan, LLP

(57) ABSTRACT

Disclosed is a fiber amplifier system including a gain fiber having a single-mode core containing dopant ions capable of producing stimulated emission of light at wavelength $\lambda_s$ when pumped with light of wavelength $\lambda_p$. Absorbing ion filtering means is operatively associated with the gain fiber to alter the gain curve. If the absorbing ions are the same as the gain ions of the gain fiber, the system further includes means for preventing pump light from exciting the gain ions of the filtering means. The excitation prevention means may take the form of means for attenuating pump light. If the absorbing ions are different from the dopant ions of the gain fiber, such absorbing ions can be subjected to light at wavelength $\alpha_p$, but they will remain unexcited. Such absorbing ions can be used to co-dope the gain fiber, or they can be incorporated into the core of a fiber that is in series with the gain fiber.

9 Claims, 4 Drawing Sheets

FIBER AMPLIFIER WITH ONE SINGLE MODE CORE HAVING MODIFIED GAIN SPECTRUM

Matter enclosed in heavy brackets [ ] appears in the original patent but forms no part of this reissue specification; matter printed in italics indicates the additions made by reissue.

BACKGROUND OF THE INVENTION

The present invention relates to fiber amplifiers having means for selectively attenuating or removing unwanted wavelengths to modify or control the amplifier gain spectrum.

Doped optical fiber amplifiers consist of an optical fiber the core of which contains a dopant such as rare earth ions. Such an amplifier receives an optical signal of wavelength $\lambda_s$ and a pump signal of wavelength $\lambda_p$ which are combined by means such as one or more couplers located at one or both ends of the amplifier. The spectral gain of a fiber amplifier is not uniform through the entire emission band.

The ability to modify the gain spectrum of a fiber amplifier is useful. Three modifications are of interest: (1) gain flattening, (2) changing the gain slope, and (3) gain narrowing. Gain flattening is of interest for such applications as wavelength division multiplexing. A change in the gain slope can be used to reduce harmonic distortion in AM modulated optical systems (see A. Lidgard et al. "Generation and Cancellation of Second-Order Harmonic Distortion in Analog Optical Systems by Interferometric FM-AM Conversion" IEEE Phot. Tech. Lett., vol. 2, 1990, pp. 519–521) Gain narrowing is of interest because although the amplifier can be operated at wavelengths away from the peak gain without gain narrowing, disadvantages occur due to: increased spontaneous-spontaneous beat noise, a reduction in gain at the signal wavelength because of amplified spontaneous emission at a second wavelength (such as at 1050 nm in a Nd fiber amplifier designed to amplify at 1300 nm), and possible laser action at the peak gain wavelength.

Various techniques have been used for flattening the gain spectrum. An optical notch filter having a Lorentzian spectrum can be placed at the output of the erbium doped gain fiber to attenuate the narrow peak. A smooth gain spectrum can be obtained, but with no increase in gain at longer wavelengths.

Another filter arrangement is disclosed in the publication, M. Tachibana et al. "Gain-Shaped Erbium-Doped Fibre Amplifier (EDFA) with Broad Spectral Bandwidth", Topical Meeting on Amplifiers and Their Applications, Optical Society of America, 1990 Technical Digest Series, Vol. 13, Aug. 6–8, 1990, pp. 44–47. An optical notch filter is incorporated in the middle of the amplifier by sandwiching a short length of amplifier fiber between a mechanical grating and a flat plate. This induces a resonant coupling at a particular wavelength between core mode and cladding leaky modes which are subsequently lost. Both the center wavelength and the strength of the filter can be tuned. The overall gain spectrum and saturation characteristics are modified to be nearly uniform over the entire 1530–1560 nm band. By incorporating the optical filter in the middle of the erbium doped fiber amplifier, the amplifier efficiency is improved for longer signal wavelengths.

SUMMARY OF THE INVENTION

An object of the present invention is to further improve the efficiency of a fiber amplifier and/or tailor the spectral output of a fiber amplifier.

The present invention relates to a fiber amplifier having spectral gain altering means. Fiber amplifiers conventionally comprise a gain optical fiber having a single-mode core containing gain ions capable of producing stimulated emission of light within a predetermined band of wavelengths including a wavelength $\lambda_s$ when pumped with light of wavelength $\lambda_p$. Means are provided for introducing a signal of wavelength $\lambda_s$ and pump light of wavelength $\lambda_p$ into the gain fiber. In accordance with this invention, the fiber amplifier is provided with absorbing ion filtering means for attenuating light at at least some of the wavelengths within the predetermined band of wavelengths including the wavelength $\lambda_s$.

In accordance with a first aspect of the invention, the absorbing ion filtering means comprises unpumped gain ions; this embodiment requires means for preventing the excitation of the unpumped gain ions by light of wavelength $\lambda_p$. In accordance with a further aspect of the invention, the absorbing ions are different from the rare earth gain ions of gain fiber.

DESCRIPTION OF THE PREFERRED EMBODIMENTS

Figure 1:
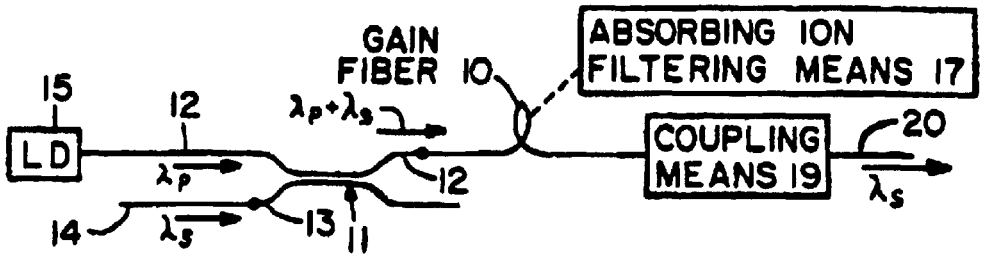
FIG. 1 is a schematic illustration of a fiber amplifier in accordance with the present invention.

Fiber amplifiers typically include a gain fiber 10 (FIG. 1), the core of which is doped with gain ions that are capable of producing stimulated emission of light within a predetermined band of wavelengths including a wavelength $\lambda_s$ when pumped with light of wavelength $\lambda_p$ that is outside the predetermined band. A wavelength division multiplexer (WDM) fiber optic coupler 11 can be used for coupling pump energy of wavelength $\lambda_p$ from laser diode 15 and the signal of wavelength $\lambda_s$ from input telecommunication fiber 14 to gain fiber 10. Such devices are disclosed in U.S. Pat. Nos. 4,938,556, 4,941,726, 4,955,025 and 4,959,837. Fusion spheres are represented by large dots in the drawings. Input fiber 14 is spliced to coupler fiber 13, and gain fiber 10 is spliced to coupler fiber 12. Splice losses are minimized when coupler 11 is formed in accordance with the teachings of copending U.S. Patent Application Ser. No. 671,075 filed Mar. 18, 1991.

Various fiber fabrication techniques have been employed in the formation of rare earth-doped amplifying and absorbing optical fibers. A preferred process, which is described in copending U.S. Patent Application Ser. No. 07/715,348 filed June 14, 1991, is a modification of a process for forming standard telecommunication fiber preforms. In accordance with the teachings of that patent application, a porous core preform is immersed in a solution of a salt of the dopant dissolved in an organic solvent having no OH groups. The solvent is removed, and the porous glass preform is heat treated to consolidate it into a non-porous glassy body containing the dopant. The glassy body is provided with cladding glass to form a draw preform or blank that is drawn into an optical fiber. The process can be tailored so that it results in the formation of a fiber having the desired MFD. The porous core preform could consist soley of core glass, or it could consist of core glass to which some cladding glass has been added. By core glass is meant a relatively high refractive index glass, e.g. germania silicate glass, that will form the core of the resultant optical fiber.

If the rare earth ions are to extend to a region of the resultant fiber beyond the core, then the porous core preform that is immersed in dopant containing solvent must contain a central core glass region and a sufficiently thick layer of cladding glass. After the resultant doped, cladding-covered core preform has been consolidated, it is provided with additional cladding glass and drawn into a fiber.

If too much rare earth dopant is added to a $GeO_2$-doped silica core, the core can crystallize. Such higher rare earth dopant levels can be achieved without crystallization of the core glass by adding $Al_2O_3$ to the core.

Figure 2:
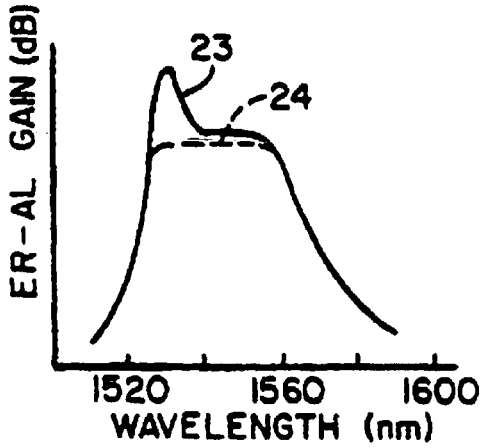
FIG. 2 is a graph showing the gain spectra of an erbium-aluminum-doped germania silicate fiber amplifier.

As indicated above, it is sometimes desirable to modify the gain spectrum of a fiber amplifier. Since the erbium-doped fiber amplifier has utility in communication systems operating at 1550 nm, that fiber amplifier is specifically discussed herein by way of example. The invention also applies to fiber amplifiers containing gain ions other than erbium, since the gain spectrum of such other fiber amplifiers can also be advantageously modified. As shown by curve 23 of FIG. 2, the gain spectra of an erbium-aluminum-doped germania silicate fiber amplifier has peak around 1532 nm and a broad band with reduced gain to about 1560 nm. It is sometimes desirable to reduce the 1532 nm peak to prevent the occurrence of such disadvantageous operation as wavelength dependent gain or gain (with concomitant noise) at unwanted wavelengths. Alternatively, it may be desirable to provide the fiber amplifier gain spectrum with a plurality of peaks so the amplifier can operate at a plurality of discrete wavelengths.

In accordance with the present invention, the amplifier spectral gain curve is altered by providing the fiber amplifier with filtering means 17 which includes absorbing ions that modify the gain spectrum by attenuating the amplified signal at various wavelengths in the gain spectrum. In accordance with a first aspect of the invention the absorbing ions are the same rare earth "gain ions" as the active gains ions in gain fiber 10; however, these absorbing gain ions must remain unpumped by light at wavelength [$_p$. Such unpumped "gain ions" can be located in a fiber that is in series with gain fiber 10, or they can be distributed along the pumped gain fiber ions of gain fiber 10 but be located at a radius that is sufficiently greater than that of the pumped gain ions that they are substantially unpumped and yet influence the propagation of light of wavelength $\lambda_s$. This first aspect is further discussed in conjunction with FIGS. 2 through 17.

In accordance with a further aspect of the invention, the absorbing ions are different from the rare earth gain ions of gain fiber 10; such absorbing ions remain unexcited when subjected to light at wavelength $\lambda_p$. The absorbing ions can be positioned as follows: (a) they can be used to co-dope the gain fiber such that they are distributed along with the gain ions (optionally at the same radius as the gain ions), or (b) they can be incorporated into the core of a fiber that is connected in series with gain fiber 10. This further aspect is further discussed in conjunction with FIGS. 18 and 19.

In the figures discussed below, elements similar to those of FIG. 1 are represented by primed reference numerals.

Figure 3:
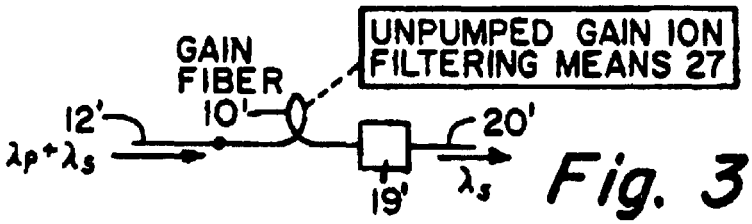
FIG. 3 is a schematic illustration showing a first aspect of the invention.

FIG. 3 generally illustrates that embodiment wherein the absorbing ions are the same rare earth "gain ions" as the active dopant ions in the gain fiber. The fiber amplifier system includes unpumped gain ion filtering means 27 for altering the amplifier spectral gain curve. The unpumped gain ions can be located in series with the pumped gain fiber ions of gain fiber 10', or they can be distributed along the pumped gain fiber ions as discussed below in conjunction with FIGS. 14 and 15.

Figure 4:
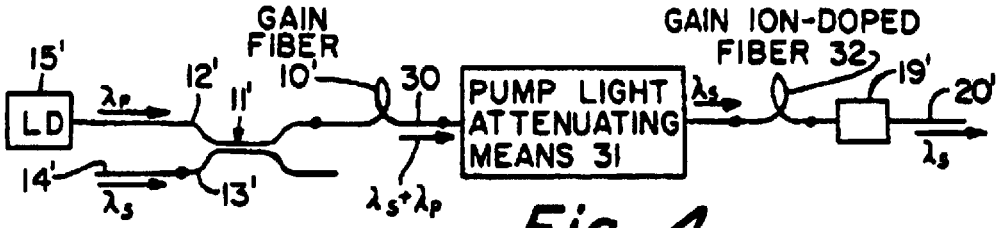
FIG. 4 is a schematic illustration of an embodiment wherein pump light attenuating means is in series with the gain fiber.

FIG. 4 shows that the unpumped gain ion filtering means can be located in series with the pumped gain fiber ions of fiber 10'. In the absence of an input signal at fiber 14', high levels of pump light can emanate from gain fiber 10'. Furthermore, some fiber amplifiers, especially those based on a three level laser system, are pumped at a power level that is sufficiently high that some remnant pump light emanates from the output end of gain fiber 10'. The presence of pump light along with the amplified signal at output end 30 of gain fiber 10' is indicated by the arrow labeled $\lambda_s+\lambda_p$. Means 31 substantially attenuates the remnant pump light, i.e. only an insignificant level of pump light, if any, remains. However, means 31 leaves the signal light at wavelength $\lambda_s$ substantially unattenuated, i e. it attenuates signal light less than about 0.5 dB. The arrow at the output of means 31 is therefore labelled $\lambda_s$. A length 32 of fiber doped with gain ions is spliced to the output end of attenuating means 31.

Figure 5:
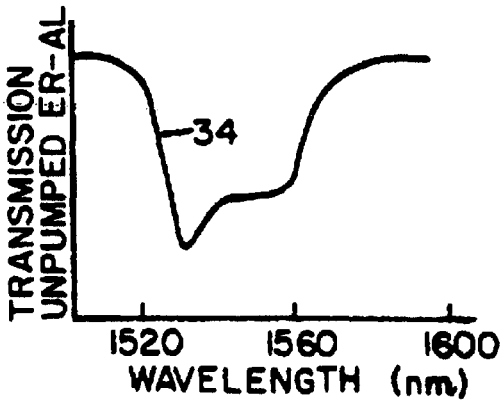
FIG. 5 is a graph illustrating the spectral transmission characteristic of an unpumped erbium-aluminum-doped germania silicate fiber that can be employed in the embodiment of FIG. 4.

If fiber 10' of FIG. 4 has a germania silicate core doped with erbium and aluminum, for example, fiber 32 can also be doped with erbium or a combination of dopants including erbium. FIG. 5 shows the spectral transmission characteristic of an optical fiber having a germania silicate core doped with aluminum and unpumped erbium ions. The reduced transmission between about 1525 and 1560 nm is caused by the absorption of light at those wavelengths by erbium ions. The depression in transmission curve 34 at 1532 nm corresponds to the gain peak in curve 23 of FIG. 2. If fibers 10' and 32 of FIG. 4 are both co-doped with aluminum and erbium ions, the effect of absorbing fiber 32 will be to flatten the spectral gain curve of the resultant fiber amplifier (see curve 24 of FIG. 2).

Figure 6:
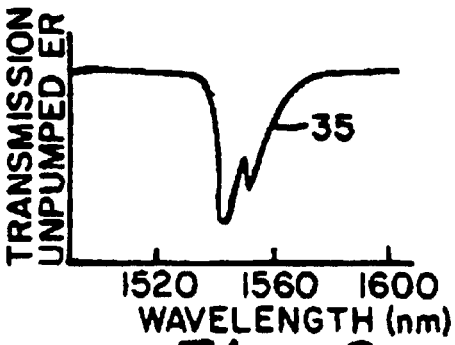
FIGS. 6 and 7 are graphs showing gain spectra and spectral transmission for a further mode of operation of FIG. 4.
Figure 7:
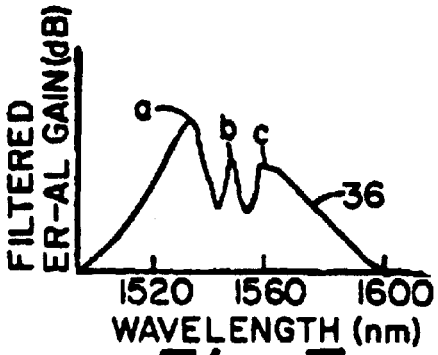

If gain ion-doped fiber 32 of FIG. 4 had a germania silicate core doped with unpumped erbium ions, its absorption spectra would be represented by curve 35 of FIG. 6. If fiber 10' had the previously described core whereby its gain spectra was represented by curve 23 of FIG. 2, the net gain spectra of the resultant fiber amplifier would be that of FIG. 7. Such an amplifier can operate at three discrete wavelengths along curve 36 where peaks a, b and c are located.

The performance of the gain-ion doped filtering fiber may be improved by quenching the Er fluorescence to minimize signal induced bleaching of the absorption. The Er fluorescence can be quenched by adding dopants such as B or OH to the fiber or by increasing the doping density of Er in the absorbing fiber, for example, to levels above 500 ppm in $SiO_2$-$GeO_2$ fibers.

Attenuating means 31 of FIG. 4 could consist of a pump light reflector such as a fiber-type grating reflector of the type disclosed in the publication: K. O. Hill et al. "Photosensitivity in Optical Fiber Waveguides: Application to Reflection Filter Fabrication" Applied Physics Letters, vol. 32, pp. 647–649, (1978).

Figure 8:
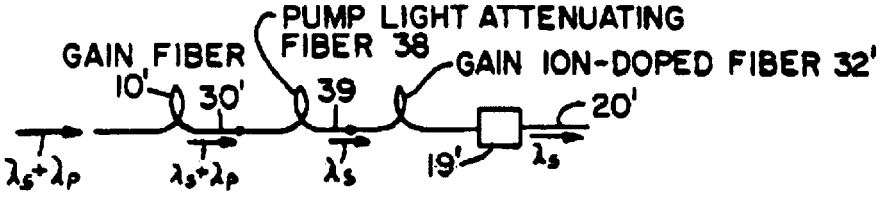
FIG. 8 illustrates a fiber amplifier in which the pump light attenuating means is an optical fiber.
Figure 9:
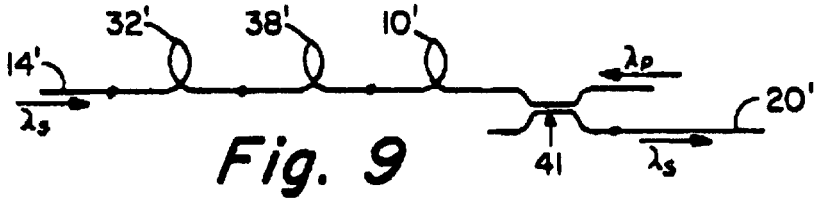
FIG. 9 is a schematic illustration of a reverse pumped fiber amplifier.

In the embodiment of FIG. 8, the pump light attenuating means is a fiber 38 that is spliced between gain fiber 10' and gain ion-doped fiber 32'. Fiber 38 must sufficiently attenuate light of wavelength $\lambda_p$ that within a relatively short length, e.g. less than 20 m, the pump power at its output end 39 is attenuated to an insignificant level while signal light at wavelength $\lambda_s$ is not unduly attenuated. Attenuating fiber 38 must be tailored to the specific gain fiber and pump wavelength. If the gain fiber 10' is an erbium-doped optical fiber that is pumped at a wavelength of 980 nm, fiber 38 can be doped with ytterbium, for example. Table 1 lists dopant candidates for use in pump light-absorbing fibers to be employed in conjunction with gain fibers doped with Er, Nd and Pr.

TABLE 1

| Gain | Wavelength | | Absorbing Ion |
|---|---|---|---|
| Ion | Signal | Pump | or Center |
| Er | 1.52-1.6 μm | 980 nm | Yb, Dy, Pr, V, CdSe |
| Er | 1.52-1.6 μm | 1480 nm | Pr, Sm |
| Er | 1.52-1.6 μm | 800 nm | Nd, Dy, Tm, V, CdSe |
| Nd | 1.25-1.35 μm | 800 nm | Dy, Er, Tm, V, CdSe |
| Pr | 1.25-1.35 μm | 1000 nm | Dy, Er, Yb, V, |

Curves of absorptivity v. wavelength were used in selecting the rare earth ions and the transition metal (vanadium) ion. The CdSe should be present in the absorbing fiber in the form of micro crystallites.

The light attenuating fiber means of this invention is also useful in fiber amplifiers employing alternate pumping schemes. In the counter-pumping device of FIG. 9, wherein elements similar to those of FIG. 8 are represented by primed reference numerals, gain fiber 10' is connected to input fiber 14' by attenuating fiber 38' and gain ion-doped fiber 32'. Pumping light of wavelength $\lambda_p$ is coupled to gain fiber 10' by coupler 41 which also couples the amplified signal to output fiber 20'. Attenuating fiber 38' removes pump light that would have excited the gain ions in fiber 32'. Since the gain ions in fiber 32' remain unexcited by pump light, fiber 32' filters the incoming signal.

Figure 10:
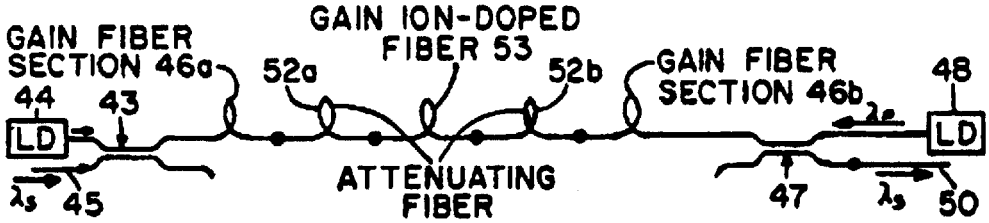
FIG. 10 is a schematic illustration of a dual ended device.

In the dual-ended device of FIG. 10, coupler 43 couples the signal from input telecommunication fiber 45 and pumping power from first pump source 44 to gain fiber section 46a, as described in conjunction with FIG. 4. Coupler 47 couples pumping power from second pump source 48 to gain fiber section 46b. The output signal of wavelength $\lambda_s$ is coupled by coupler 47 from gain fiber section 46b to outgoing telecommunication fiber 50. Pump light attenuating fibers 52a and 52b are spliced to gain fiber sections 46a and 46b. A length 53 of fiber doped with gain ions is spliced between attenuating fiber sections 52a and 52b. In the absence of the attenuating fiber sections, remnant pump light from sources 44 and 48 would be coupled from the gain fiber sections 46a and 46b, respectively, to gain ion-doped fiber 53, thereby negating its filtering ability. Since the characteristics of fiber 53 are similar to those of fiber 32' of FIG. 8, the fiber amplifier is provided with a modified spectral gain.

The signal is first introduced into section 46a where it gradually increases in amplitude due to amplification in that section. The amplitude of the original that is introduced into section 46b is therefore much greater that that which was introduced into section 46a. The pump power is therefore absorbed at a greater rate per unit length in section 46b, and section 46b can be shorter than section 46a.

Figure 11:
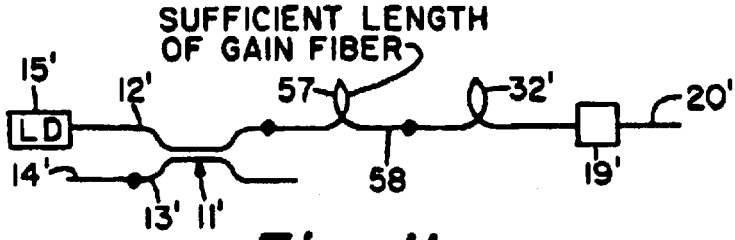
FIGS. 11, 12, and 13 and schematic illustrations of fiber amplifier embodiment in which the gain ion-doped signal filtering means is in series with the gain fiber.

In the embodiment of FIG. 11 the length of gain fiber 57 is sufficient to dissipate all of the pump light from source 15' so that essentially no pump light reaches end 58 thereof. Gain ion-doped fiber 32' can therefore filter the amplified signal. However, for lowest noise amplification, an adequate pump light intensity should exist throughout the amplifier medium. The amplifier of FIG. 11 therefore generates more noise than previously described embodiments.

Figure 12:
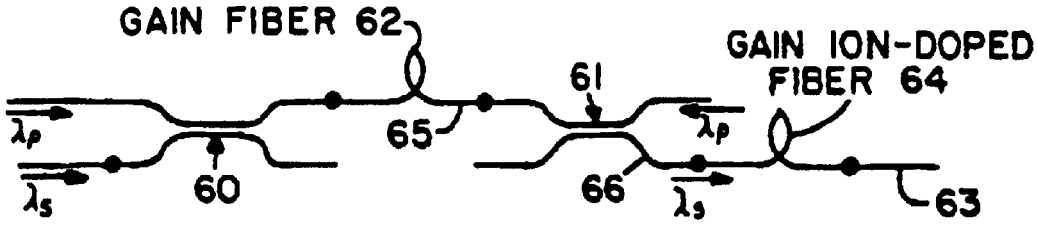

Gain fiber 62 of FIG. 12 can be provided with pump power from either or both of the couplers 60 and 61. This embodiment pertains to forward pumped, reverse pumped and double pumped fiber amplifiers. In the reverse pumped embodiment, coupler 60 is unnecessary. In all cases, the signal is amplified by gain fiber 62 and coupled to outgoing telecommunication fiber by coupler 61. In the reverse pumping mode, pump light propagates from coupler 61 into end 65 of gain fiber 62. In the forward and double pump situations, only a small fraction of the remnant pump light exiting output end 65 of fiber 62 is coupled to coupler fiber 66. Since gain ion-doped fiber 64 remains essentially unpumped, it filters the amplified signal light that is coupled to outgoing telecommunication fiber 63.

Figure 13:
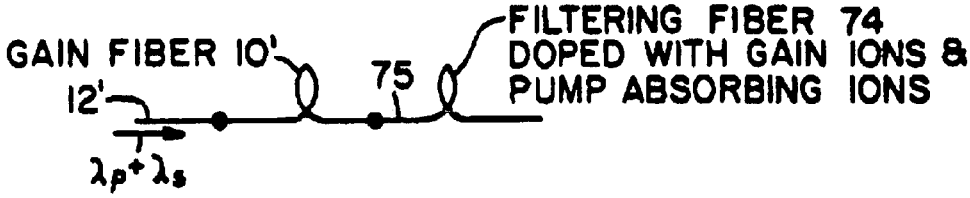

FIG. 13 shows a simplified embodiment wherein filtering fiber 74 contains a dopant that absorbs pump light; it also contains gain ions for altering the amplifier spectral gain curve. The concentration of the pump light attenuating ions is such that their absorption is much greater than that of the gain ions in fiber 74. For example, the absorption of pump light might be ten times the absorption of signal light. Thus, the remnant pump light is absorbed within a short distance of the input end 75 of fiber 74. The remainder of fiber 74 filters the amplified signal from fiber 10'.

Figure 14:
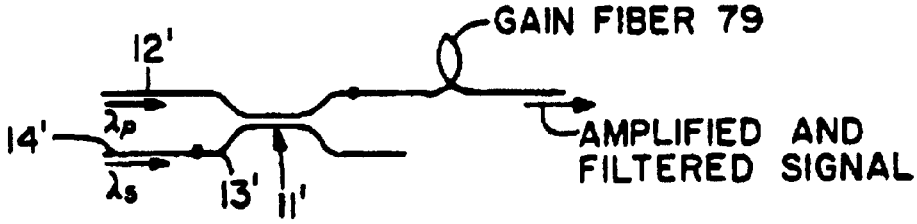
FIG. 14 is a schematic illustration of a fiber amplifier embodiment in which the gain ion-doped signal filtering means is distributed along the gain filter.
Figure 15:
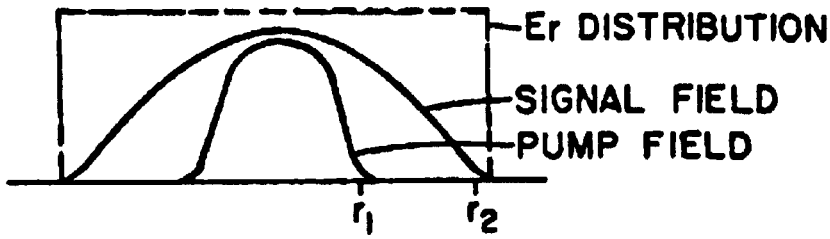
FIG. 15 is a graph illustrating the radial distribution of signal and pump power within the gain fiber of FIG. 14.

In the embodiment of FIG. 14, gain fiber 79 itself is designed such that it contains dopant ions at a sufficiently large radius that only the relatively large mode field of the signal light reaches the large radii dopant ions. As shown in FIG. 15, the signal field extends to a greater radius in gain fiber 79 than the pump field. If the signal field extends to radius $r_2$, the erbium ions, for example, should also extend to a radius of about $r_2$. Since Er ions having radii larger than about $r_1$ remain umpumped, those large radii Er ions are available for filtering the signal.

Figure 16:
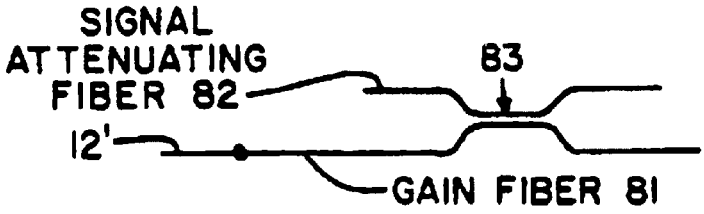
FIG. 16 is a schematic illustration of a fiber amplifier embodiment in which the gain ion-doped signal filtering means is contained within a fiber that extends along the gain fiber.
Figure 17:
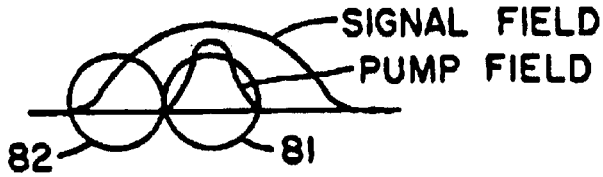
FIG. 17 is a graph illustrating the radial distribution of signal and pump power within coupler 83 of FIG. 16.

The embodiment of FIG. 16 employs a fiber optic coupler-type device 83 that is formed by fusing together a gain fiber 81 and a gain ion doped signal attenuating fiber 82. Device 83 can be similar to the overclad coupler of the type disclosed in U.S. Pat. No. 4,931,076 or the fused fiber coupler of the type disclosed in T. Bricheno et al. "Stable Low-Loss Single-Mode Couplers" Electronics Letters, vol. 20, pp. 230–232 (1984). Pump light and signal are coupled to gain fiber 81 from input coupler fiber 12'. The fibers 81 and 82 of coupler 83 have sufficiently different propagation constants that, because of the resultant $\Delta\beta$, no coupling occurs. However, the large radius signal field from gain fiber 81 significantly overlaps the absorbing region of fiber 82 in that portion of the coupler where fibers 81 and 82 are fused together and stretched to decrease the distance between cores. Since there is a negligible overlap of the smaller radius pump field into the gain ion-doped region of fiber 82 (see FIG. 17), the gain ions remain unexcited and can filter the signal light.

Figure 18:
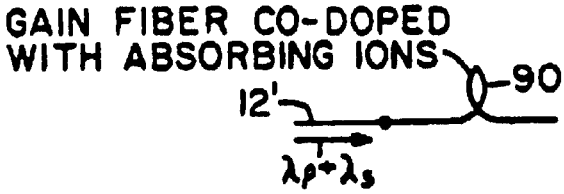
FIGS. 18 and 19 are schematic illustrations of fiber amplifier embodiment in which the absorbing ions of the signal filtering means are different from the gain ions.
Figure 19:
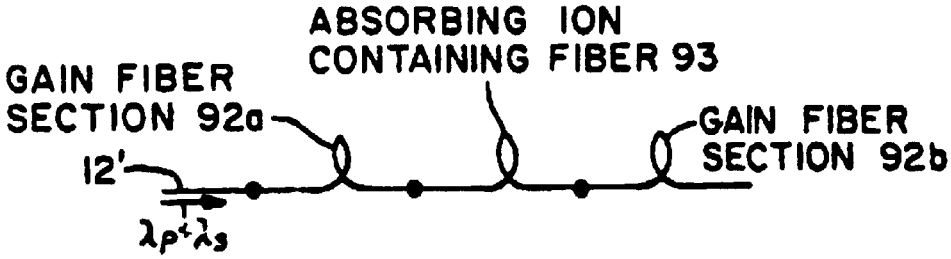

That aspect of the invention wherein the signal absorbing ions are different from the rare earth gain ions of the gain fiber is illustrated in FIGS. 18 and 19. The fiber amplifier of FIG. 18 includes gain fiber 90, the core of which is doped with gain ions that are capable of producing stimulated emission of light within a band of wavelengths including a wavelength $\lambda_s$ when pumped with light of wavelength $\lambda_p$. The signal and pump light are coupled to gain fiber 90 via coupler fiber 12'. Gain fiber 90 is co-doped with absorbing ions that are different from the gain ions; therefore, the pump light attenuating means of the previous embodiments can be eliminated. Table 2 lists dopant candidates for use as absorbing ions to be employed in conjunction with gain fibers in which Er, Nd and Pr are the gain ions.

TABLE 2

| Gain Ion | Gain Wavelength Range | Absorbing Ion |
|---|---|---|
| Er | 1.52-1.61 μm | Pr, Sm |
| Nd | 1.25-1.35 μm (undesired gain at 1050 nm) | Sm, Dy, Pr |
| Pr | 1.25-1.35 μm | Sm, Dy, Nd |

Curves of absorptivity v. wavelength were used in selecting the absorbing ions of Table 2.

During the fabrication of a preform for drawing a gain fiber that is co-doped with absorbing ions as well as active gain ions, the central region of the fiber is provided with a sufficient concentration of active gain ions to provide the desired amplification; it is also provided with a sufficient concentration of absorbing ions to attenuate the undesired portion or modify the gain spectrum. Such a fiber could be formed in accordance with the aforementioned U.S. Pat. Application Ser. No. 07/715,348 by immersing the porous core preform in a dopant solution containing salts of both the active dopant ion and the absorbing ion.

That embodiment wherein the absorbing ions are incorporated into the core of a fiber that is connected in series with gain fiber is shown in FIG. 19 wherein absorbing fiber 93 is spliced between two sections 92a and 92b of gain fiber. Alternatively, the absorbing fiber could be spliced to the output end or input end of a single section of gain fiber.

We claim:

[1. A fiber amplifier comprising a gain optical fiber having a single-mode core containing dopant ions capable of producing stimulated emission of light within a predetermined band of wavelengths including a wavelength $\lambda_s$ when pumped with light of wavelength $\lambda_p$, said gain fiber having input and output ends, absorbing ion filtering means for attenuating light at at least some of the wavelengths within said predetermined band of wavelengths, said absorbing ion filtering means comprising umpumped gain ions, means for introducing a signal of wavelength $\lambda_s$ into said gain fiber input end, means introducing pump light of wavelength $\lambda_p$ into said gain fiber, and means for preventing the excitation of said pumped gain ions by light of wavelength $\lambda_p$.]

[2. A fiber amplifier in accordance with claim 1 wherein said umpumped gain ions are situated in a signal filtering optical fiber that is connected in series with said gain fiber.]

[3. A fiber amplifier in accordance with claim 2 wherein said means for preventing excitation is connected in series between said gain fiber and said filtering optical fiber.]

[4. A fiber amplifier in accordance with claim 3 wherein said means for preventing excitation comprises a fiber-type grating reflector for reflecting pump light.]

[5. A fiber amplifier in accordance with claim 3 wherein said means for preventing excitation comprises interference filter means for removing pump light.]

[6. A fiber amplifier in accordance with claim 3 wherein said means for preventing excitation comprises an optical fiber containing a dopant that substantially attenuates light at wavelength $\lambda_p$.]

[7. A fiber amplifier in accordance with claim 6 wherein said pump light attenuating optical fiber connects said signal attenuating fiber to the input end of said gain fiber.]

[8. A fiber amplifier in accordance with claim 6 wherein said gain fiber comprises first and second sections, and said pump light attenuating fiber comprises first and second sections, said fiber amplifier comprises the serially connected arrangement of the first section of said gain fiber, said first section of said pump light attenuating fiber, said gain ion-doped pump light attenuating fiber, the second section of said pump light attenuating fiber and the second section of said gain fiber, said means for introducing pump light comprising means for introducing pump light into said first and second gain fiber sections.]

[9. A fiber amplifier in accordance with claim 3 wherein means for preventing excitation comprises an optical fiber coupler which couples essentially no pump light from said gain fiber to said signal attenuating fiber.]

[10. A fiber amplifier in accordance with claim 1 wherein said means preventing excitation of umpumped gain ions by pump light comprises a sufficient length of gain fiber to dissipate all of the pump light introduced therein.]

[11. A fiber amplifier in accordance with claim 1 wherein said absorbing ion filtering means comprises an optical fiber containing unpumped gain ions and a dopant for absorbing pump light, the concentration of said dopant being much greater than unpumped gain ions.]

[12. A fiber amplifier in accordance with claim 1 wherein the radial distribution of said gain ions in said gain fiber extends beyond the mode field radius of light of wavelength $\lambda_p$, whereby those gain ions at radii greater than said mo field radius are unexcited by pump light and are free to absorb signal light.]

[13. A fiber amplifier in accordance with claim 1 wherein a section of said gain fiber is fused in side-by-side arrangement to a further section of optical fiber doped with gain ions to form a fused region into which signal light but not pump light can extend from said gain fiber into said further section, whereby those gain ions of said further section are unexcited by pump light and are free to absorb signal light.]

[14. A fiber amplifier in accordance with claim 1 said gain fiber is in series with an optical fiber containing signal light absorbing ions that are different from said gain ions.]

[15. A fiber amplifier comprising a gain optical fiber having a single-mode core containing gain ions capable of producing stimulated emission of signal light within a predetermined band of wavelengths including a wavelength $\lambda_s$ when pumped with pump light of wavelength $\lambda_p$, said gain fiber having first and second ends, a filtering fiber containing gain ions for filtering signal light, a pump light-attenuating fiber having a core containing a dopant that attenuates said pump light while signal light remains substantially unattenuated, said pump light-attenuating fiber connecting the second end of said gain fiber to an end of said filtering fiber, means for introducing pump light of wavelength $\lambda_p$ into the first end of said said gain fiber, and means for introducing a signal of wavelength $\lambda_s$ into one of the ends of the series combination of said gain fiber, said pump light-attenuating fiber and said filtering fiber, the gain ions of said filtering fiber remaining unexcited during operation because of the pump light filtering action of said pump light-attenuating fiber, whereby said filtering fiber alters the spectral gain of said amplifier.]

[16. A fiber amplifier comprising first and second gain optical fiber sections, each having a single-mode core containing dopant ions capable of producing stimulated emission of light within a predetermined band of wavelengths including a wavelength $\lambda_s$ when pumped with light of wavelength $\lambda_p$, each gain fiber section having first and second ends, first and second pump light-attenuating fiber sections, each having a core containing a dopant that attenuates optical power in at least one wavelength band including said wavelength $\lambda_p$, while optical power at said wavelength $\lambda_s$ remains substantially unattenuated thereby, each pump light-attenuating fiber section having first and second ends, the first end of each of said pump light-attenuating fiber sections being spliced to a respective one of the second ends of said gain fiber sections, a filtering fiber, the ends of which are respectively connected to the second ends of said pump light attenuating fiber sections, said filtering fiber being doped with gain ions, means for introducing pump light of wavelength $\lambda_p$ into the first end of each of said gain fiber sections, and means for introducing a signal of wavelength $\lambda_s$ into the first end of one of said gain fiber sections, the gain ions of said filtering fiber remaining unexcited during operation because of the pump light filtering action of said pump light-attenuating fiber.]

[17. A fiber amplifier comprising a gain optical fiber having a single-mode core containing dopant ions capable of producing stimulated emission of light within a predetermined band of wavelengths including a wavelength $\lambda_s$ when pumped with light of wavelength $\lambda_p$, said gain fiber having input and output ends, filtering means for attenuating light at at least some of the wavelengths within said predetermined band of wavelengths, said filtering means containing ions that can be excited by light of wavelength $\lambda_p$.

means for introducing a signal of wavelength $\lambda_s$ into said gain fiber input end, means introducing pump light of wavelength $\lambda_p$ into said gain fiber, and means for preventing the excitation of said filtering means by light of wavelength $\lambda_p$.]

[18. A fiber amplifier in accordance with claim 17 wherein said gain fiber is co-doped with signal light absorbing ions that are different from said gain ions.]

[19. A fiber amplifier comprising a gain optical fiber having a single-mode core containing dopant ions capable of producing stimulated emission of light within a predetermined band of wavelengths including a wavelength $\lambda_s$ when pumped with light of wavelength $\lambda_p$, said gain fiber having input and output ends, said dopant ions being selected from the group consisting of erbium, neodymium and praseodymium, filtering means for attenuating light at at least some of the wavelengths within said predetermined band of wavelengths, said filtering means containing a dopant selected from the group consisting of erbium, dysprosium, neodymium, ytterbium, samarium, praseodymium, thulium, vanadium and cadmium selenide, means for introducing a signal of wavelength $\lambda_s$ into said gain fiber input end, and means introducing pump light of wavelength $\lambda_p$ into said gain fiber.]

[20. A gain amplifier in accordance with claim 19 wherein said filtering means comprises an optical fiber containing said dopant ions.]

*21. A fiber amplifier comprising*

*a gain optical fiber having only one single-mode core, said core containing dopant ions capable of producing stimulated emission of light within a predetermined band of wavelengths including a wavelength $\lambda_s$ when pumped with light of wavelength $\lambda_p$, said gain fiber having input and output ends, said dopant ions being selected from the group consisting of erbium, neodymium and praseodymium,*

*filtering means for attenuating light at at least some of the wavelengths within said predetermined band of wavelengths, said filtering means containing a dopant selected from the group consisting of erbium, dysprosium, neodymium, ytterbium, samarium, praseodymium, thulium, vanadium and cadmium selenide,*

*means for introducing a signal of wavelength $\lambda_s$ into said gain fiber input end,*

*means for introducing pump light of wavelength $\lambda_p$ into said gain fiber, and*

*means for preventing the excitation of said filtering means by light of wavelength $\lambda_p$, wherein means for preventing the excitation is disposed between the gain optical fiber and the filtering means, wherein the means for preventing the excitation includes an optical fiber having a dopant that substantially attenuates light at wavelength $\lambda_p$.*

*22. A gain amplifier in accordance with claim 21 wherein said filtering means comprises an optical fiber containing said dopant ions.*

*23. A fiber amplifier having a flattened gain spectrum comprising*

*a gain optical fiber having only one single-mode core, said core containing dopant ions capable of producing a gain spectrum due to stimulated emission of light within a predetermined band of wavelengths including*

*a wavelength $\lambda_s$ when pumped with light of wavelength $\lambda_p$, said gain fiber having input and output ends, and wherein the gain spectrum of said gain optical fiber over said band of wavelengths has a first portion having a relatively small gain variation over a region of said band wavelengths and a second portion having a relatively large gain variation over a different region of said band wavelengths, wherein said first portion of the gain spectrum is relatively flat and wherein said second portion is not flat and exhibits a greater gain than the gain exhibited over said relatively flat portion;*

*ion filtering means for absorbing light within said predetermined band of wavelengths, said ion filtering means having an absorption spectrum having a first portion exhibiting relatively small absorption over said region of said band of wavelengths and a second portion having a relatively large absorption of said different region of said band of wavelengths where the gain spectrum is not flat, said ion filtering means comprising a concentration and distribution of unpumped gain ions within said ion filtering means wherein amplified light having wavelengths within said predetermined band of wavelengths where the gain spectrum is not flat is attenuated to an extent such that the gain spectrum over the entire predetermined band of wavelengths is flattened and exhibits relatively small gain variation over said entire band of wavelengths;*

*means for introducing a signal of wavelength $\lambda_s$ into said gain fiber input end,*

*means introducing pump of wavelength $\lambda_p$ into said gain fiber, and*

*means for preventing the excitation of said pumped gain ions by light of wavelength $\lambda_p$ wherein means for preventing the excitation is disposed between the gain optical fiber and the ion filtering means, wherein the means for preventing the excitation includes an optical fiber having a dopant that substantially attenuates light at wavelength $\lambda_p$.*

*24. A fiber amplifier comprising*

*a gain optical fiber having only one single-mode core, said core containing dopant ions capable of producing stimulated emission of light within a predetermined band of wavelengths including a wavelength $\lambda_s$ when pumped with light of wavelength $\lambda_p$, said gain fiber having input and output ends, said dopant ions being selected from the group consisting of erbium, neodymium and praseodymium, and wherein the gain spectrum of said gain optical fiber, over said band of wavelengths and pumped with light from wavelength $\lambda_p$ has a first portion which is relatively flat and a second portion which is not flat and exhibits gain greater than the gain exhibited over said relatively flat portion;*

*filtering means for attenuating light at at least some of the wavelengths within said predetermined band of wavelengths, said filtering means containing a dopant selected from the group consisting of erbium, dysprosium, neodymium, ytterbium, samarium, praseodymium, thulium, vanadium and cadmium selenide, said filtering means having a transmission curve over said predetermined band of wavelengths and in the absence of excitation by said gain fiber over said predetermined band of wavelengths when said gain fiber is excited by light at wavelength $\lambda_p$ so that when light in the range of said predetermined range of wavelengths is amplified and filtered by said filtering means, the resulting gain spectrum for said amplifier over said predetermined range of wavelengths is substantially flat;*

*means for introducing a signal of wavelength $\lambda_s$ into said gain fiber input end;*

*means introducing pump of wavelength $\lambda_p$ into said gain fiber, and*

*means for preventing the excitation of said pumped gain ions by light of wavelength $\lambda_p$ wherein means for preventing the excitation is disposed between the gain optical fiber and the filtering means, wherein the means for preventing the excitation includes an optical fiber having a dopant that substantially attenuates light at wavelength $\lambda_p$.*

*25. The fiber amplifier in accordance with claim 21, wherein the means for introducing pump light of wavelength $\lambda_p$ is a laser diode.*

*26. The fiber amplifier in accordance with claim 21, wherein the means for introducing a signal of wavelength $\lambda_s$ is a telecommunication fiber.*

*27. The fiber amplifier in accordance with claim 21, further comprising a coupler member configured to connect the means for introducing the signal of wavelength $\lambda_s$ and said gain fiber.*

*28. The fiber amplifier in accordance with claim 27, wherein the coupler member further connects the means introducing pump light of wavelength $\lambda_p$ and said gain fiber.*

*29. The fiber amplifier in accordance with claim 21, wherein said gain fiber is in series with an optical fiber containing signal light absorbing ions that are different from said ions in said gain optical fiber.*

* * * * *